(12) United States Patent
Yang et al.

(10) Patent No.: US 10,860,480 B2
(45) Date of Patent: Dec. 8, 2020

(54) METHOD AND DEVICE FOR CACHE MANAGEMENT

(71) Applicant: EMC IP Holding Company LLC, Hopkinton, MA (US)

(72) Inventors: Lifeng Yang, Beijing (CN); Ruiyong Jia, Beijing (CN); Liam Xiongcheng Li, Beijing (CN); Hongpo Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 8 days.

(21) Appl. No.: 16/021,719

(22) Filed: Jun. 28, 2018

(65) Prior Publication Data

US 2019/0057030 A1 Feb. 21, 2019

(30) Foreign Application Priority Data

Jun. 30, 2017 (CN) .......................... 2017 1 0526281

(51) Int. Cl.
| | | |
|---|---|---|
| *G06F 12/0802* | (2016.01) | |
| *G06F 12/0879* | (2016.01) | |
| *G06F 12/0846* | (2016.01) | |
| *G06F 12/0804* | (2016.01) | |
| *G06F 12/02* | (2006.01) | |
| *G06F 12/126* | (2016.01) | |

(52) U.S. Cl.
CPC ...... *G06F 12/0802* (2013.01); *G06F 12/0804* (2013.01); *G06F 12/0846* (2013.01); *G06F 12/0879* (2013.01); *G06F 12/0284* (2013.01); *G06F 12/126* (2013.01); *G06F 2212/1024* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 6,044,478 A | 3/2000 | Green | |
| 9,268,708 B2 | 2/2016 | Damodaran et al. | |
| 9,438,688 B1 | 9/2016 | Clark et al. | |
| 9,542,257 B2 | 1/2017 | Dewey et al. | |
| 2003/0159001 A1* | 8/2003 | Chalmer | G06F 3/0601 711/120 |
| 2008/0040548 A1 | 2/2008 | Day et al. | |
| 2011/0022800 A1* | 1/2011 | Porat | G06F 12/126 711/118 |
| 2012/0179874 A1* | 7/2012 | Chang | G06F 9/45558 711/128 |
| 2013/0046933 A1* | 2/2013 | Le | G06F 13/16 711/118 |
| 2017/0094011 A1* | 3/2017 | Cheng | G06F 16/2365 |

* cited by examiner

*Primary Examiner* — Charles Rones
*Assistant Examiner* — Jonah C Krieger
(74) *Attorney, Agent, or Firm* — BainwoodHuang

(57) ABSTRACT

Embodiments of the present disclosure relate to a method and a device for cache management. The method includes: in response to receiving a write request for a cache logic unit, determining whether a first cache space of a plurality of cache spaces associated with the cache logic unit is locked; in response to the first cache space being locked, obtaining a second cache space from the plurality of cache spaces, the second cache space being different from the first cache space and being in an unlocked state; and performing, in the second cache space, the write request for the cache logic unit.

15 Claims, 8 Drawing Sheets

METHOD AND DEVICE FOR CACHE MANAGEMENT

RELATED APPLICATIONS

This application claim priority from Chinese Patent Application Number CN 201710526281.8, filed on Jun. 30, 2017 at the State Intellectual Property Office, China, titled "METHOD AND DEVICE FOR CACHE MANAGEMENT" the contents of which is herein incorporated by reference in its entirety.

FIELD

Embodiments of the present disclosure generally relate to the field of data storage, and more specifically, to a method, a device and a computer program product for cache management.

BACKGROUND

With development of the data storage technology, various data storage devices are capable of providing an increasingly higher data storage, and the data access speed is improved significantly as well. As the data storage ability is being improved, the users put forward a growing demand on higher data reliability and faster response time of a storage system, accordingly.

Nowadays, there has been developed a technical solution of constructing a storage system based on multiple stages of storage media with different access speeds. The storage system may receive a plurality of parallel I/O requests, and when there are a plurality of parallel I/O requests directed to the same physical storage address, a cache I/O confliction may occur. That is, when a certain I/O request is accessing a cache, it locks the accessed cache page, causing other I/O requests to wait until execution of the previous I/O request is completed, and the caching efficiency is thus lowered. Therefore, how to effectively increase concurrency of the I/O requests for the cache becomes a hot issue.

SUMMARY

Embodiments of the present disclosure provide a solution of cache management.

In accordance with a first aspect of the present disclosure, there is provided a method of cache management. The method comprises: in response to receiving a write request for a cache logic unit, determining whether a first cache space of a plurality of cache spaces associated with the cache logic unit is locked; in response to the first cache space being locked, obtaining a second cache space from the plurality of cache spaces, the second cache space being different from the first cache space and being in an unlocked state; and performing, in the second cache pace, the write request for the cache logic unit.

In accordance with a second aspect of the present disclosure, there is provided a device of cache management. The device comprises: at least one processing unit; and at least one memory coupled to the at least one processing unit and storing instructions executed by the at least one processing unit, the instructions when executed by the at least one processing unit causing the device to execute acts, the acts comprising: in response to receiving a write request for a cache logic unit, determining whether a first cache space of a plurality of cache spaces associated with the cache logic unit is locked; in response to the first cache space being locked, obtaining a second cache space from the plurality of cache spaces, the second cache space being different from the first cache space and being in an unlocked state; and performing, in the second cache pace, the write request for the cache logic unit.

In accordance with a third aspect of the present disclosure, there is provided a computer program product. The computer program product is tangibly stored on a non-transient computer storage medium and includes machine executable instructions, and the machine executable instructions when operating in a device cause the device to perform any step of the method in accordance with the first aspect of the present disclosure.

BRIEF DESCRIPTION OF THE DRAWINGS

The above and other objectives, features, and advantages of example embodiments of the present disclosure will become more apparent from the following detailed description with reference to the accompanying drawings, wherein the identical reference sign refers to the identical elements in the example embodiments of the present disclosure.

DETAILED DESCRIPTION OF EMBODIMENTS

The example embodiments disclosed herein will now be described with reference to the accompanying drawings. Although the drawings illustrate the preferred embodiments of the present disclosure, it would be appreciated that the present disclosure can be implemented in various forms but cannot be limited by the embodiments described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." The terms "first," "second," and the like may refer to different or same objects. Other definitions, explicit and implicit, may be included below.

Figure 1:
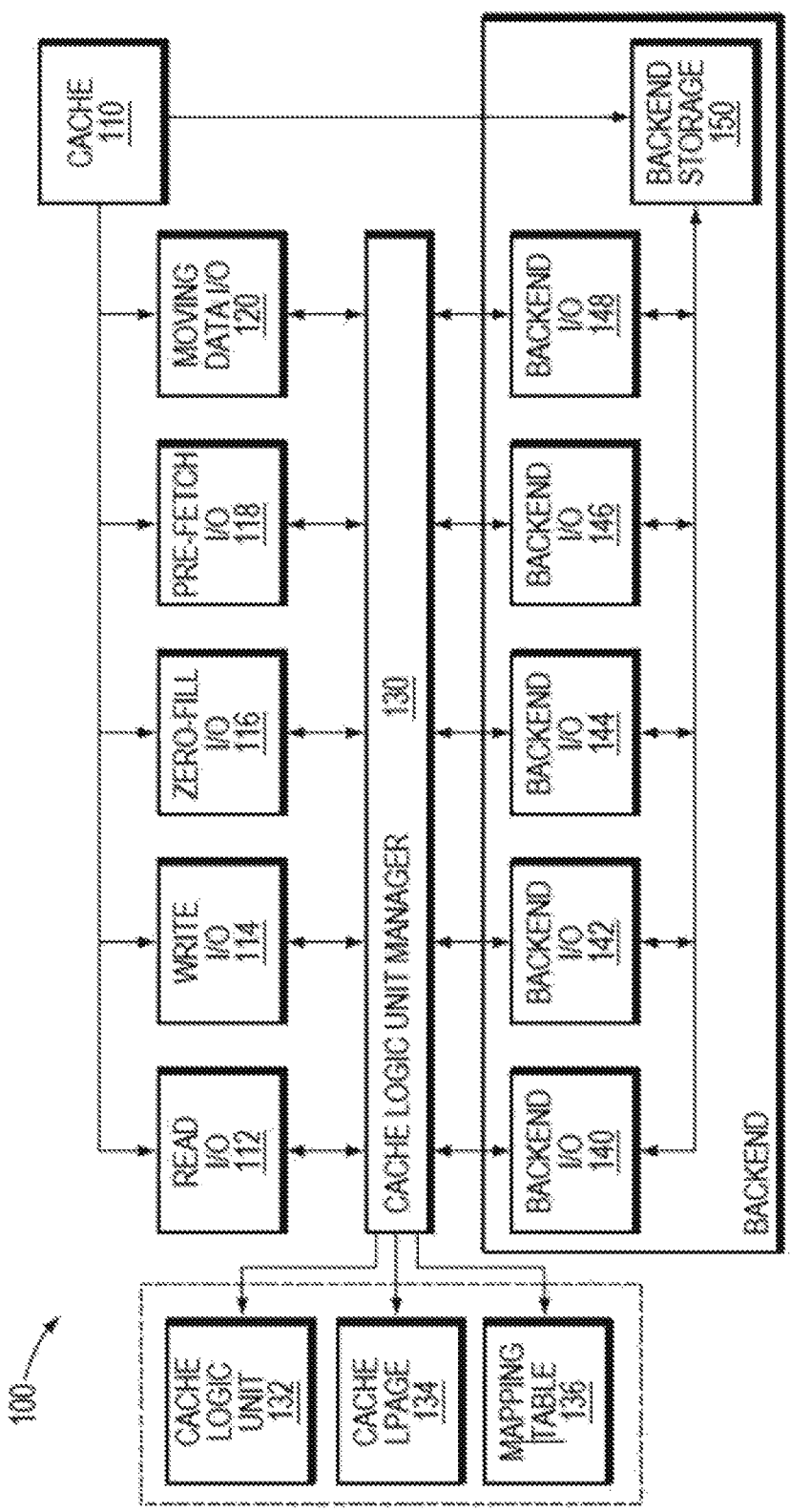
FIG. 1 illustrates a diagram of cache management system architecture.

As described above, traditional cache management provides a low I/O request concurrency. FIG. 1 illustrates a diagram of cache management system architecture 100. As shown in FIG. 1, in the architecture 100, a cache 110 is controlled through a cache logic unit manager 130 to respond to various I/O requests received (such as read I/O 112, write I/O request 114, zero-fill I/O request 116, prefetch I/O request 118, data moving I/O request 120 and the like), and an interaction between a cache 110 and a backend storage 150 is implemented through the cache logic unit manager 130 via various backend I/O requests 140-148.

The cache logic unit manager 130 may include a cache logic unit 132, a cache page 134 and a mapping table 136. The cache logic unit 132 is a minimum management unit in a cache module, and each cache logic unit 132 may correspond to a particular physical address space in the backend storage 150. Each cache logic unit 132 may include a plurality of cache pages 134. For example, in some embodiments, a single cache logic unit may be 64 Kb, which may be comprised of 8 cache pages (each being 8 Kb). In addition, a mapping between each cache logic unit 132 and a plurality of corresponding cache pages 134 is stored in the mapping table 136. The storage manager 130 may obtain the plurality of cache pages 134 corresponding to the cache logic unit 132 by querying the mapping table.

Figure 2:
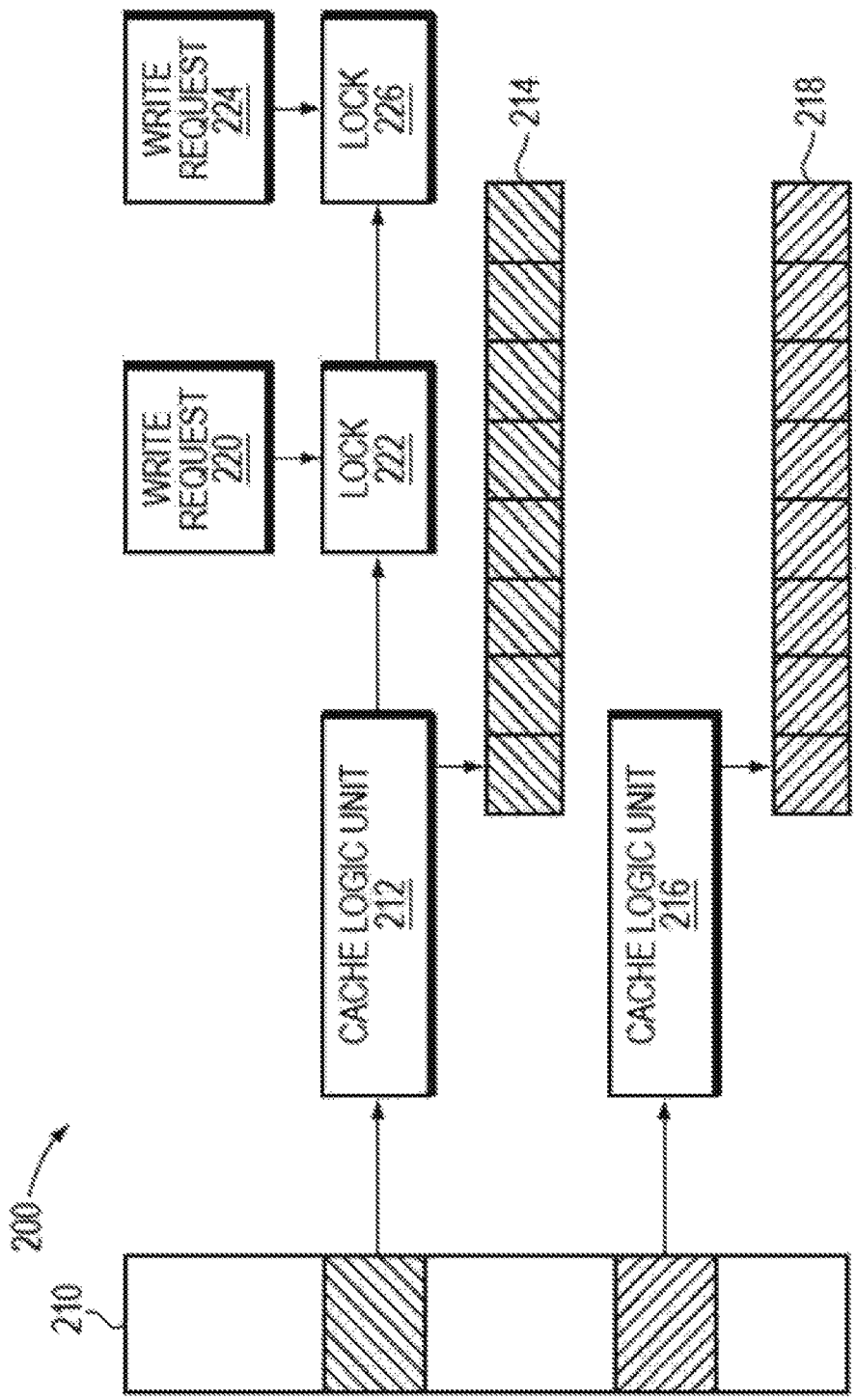
FIG. 2 illustrates a diagram of traditional cache management.

FIG. 2 illustrates a diagram 200 of cache management in a traditional solution. As shown in FIG. 2, a cache 210 includes a first cache logic unit 212 and a second cache logic unit 216, and the first cache logic unit 212 and the second cache logic unit 216 are associated with a first set of cache pages 214 and a second set of cache pages 218, respectively. When a first write request 220 for the cache logic unit 212 is being executed, a first locking 222 for the cache logic unit 212 is added. When a subsequent second write request 224 for the cache logic unit 212 is received, the cache logic unit 212 is locked by the first locking 222, not allowing the second write request 224 to be executed. The second write request 224 is then added into a queue and a second locking 226 for the cache logic unit 212 is added. After completing the first write request 220, the first locking 222 is unlocked, and the second write request 224 may be executed at this time. In this way, a plurality of write requests of the same cache logic unit 212 may only be executed in order, thus affecting the caching efficiency.

In order to solve the above problem and other potential problems, embodiments of the present disclosure provide a solution of cache management. According to various example embodiments of the present disclosure, a single cache logic unit is associated with a plurality of different cache spaces, and when a plurality of write requests for the cache logic unit are received, each write request may be written in parallel into different cache spaces of the same cache logic unit, so as to improve the concurrency of the cache write requests. Moreover, when a read request for the cache logic unit is received, the relation between target spaces for the read request and the last write request is used to determine whether data merging among a plurality of cache spaces associated with the cache logic unit is needed. In addition, the system may also, in responsive to a flush request, execute data merging among the plurality of cache spaces associated with the cache logic unit, and write the merged data into the backend storage.

With this cache management method, the cache system may support parallel execution of a plurality of write requests, provide a timely and accurate response to a read request, and ensure accuracy of the data written into the backend storage. Therefore, the problem that a plurality of I/O requests for the same cache logic unit cannot be executed in parallel may be solved, significantly increasing the concurrency of a plurality of I/O requests for the cache and further improving the efficiency of the storage system.

Figure 3:
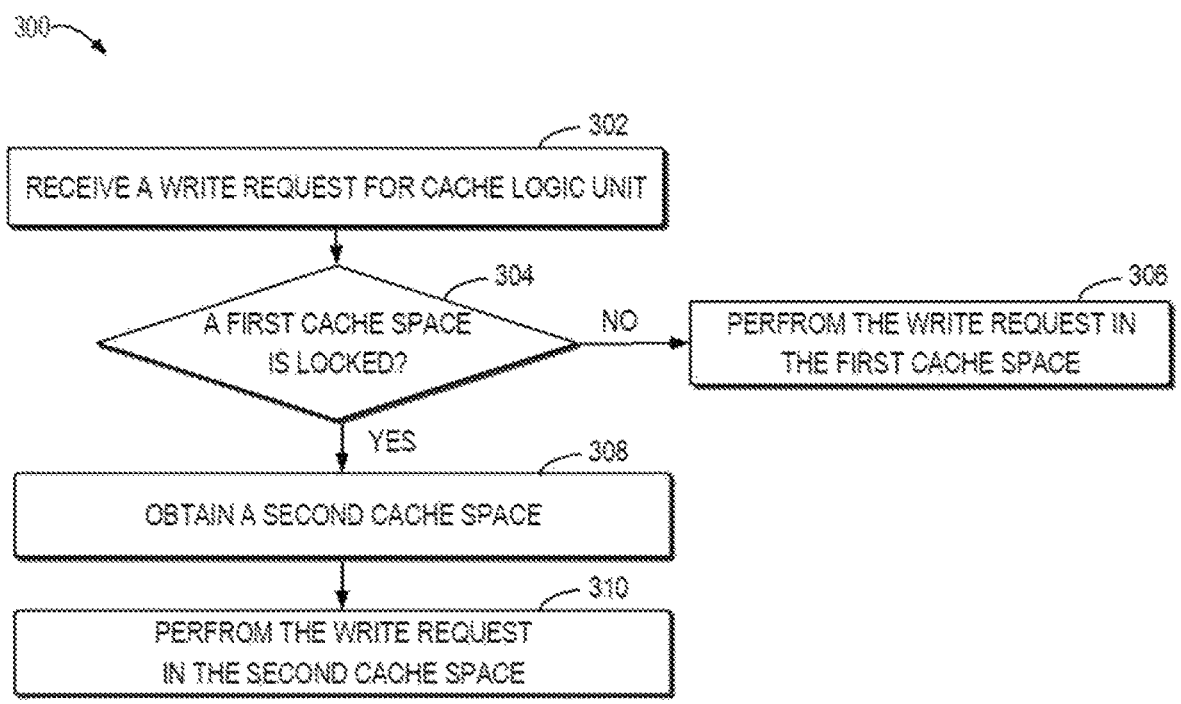
FIG. 3 illustrates a flowchart of a method for cache management according to embodiments of the present disclosure.
Figure 4:
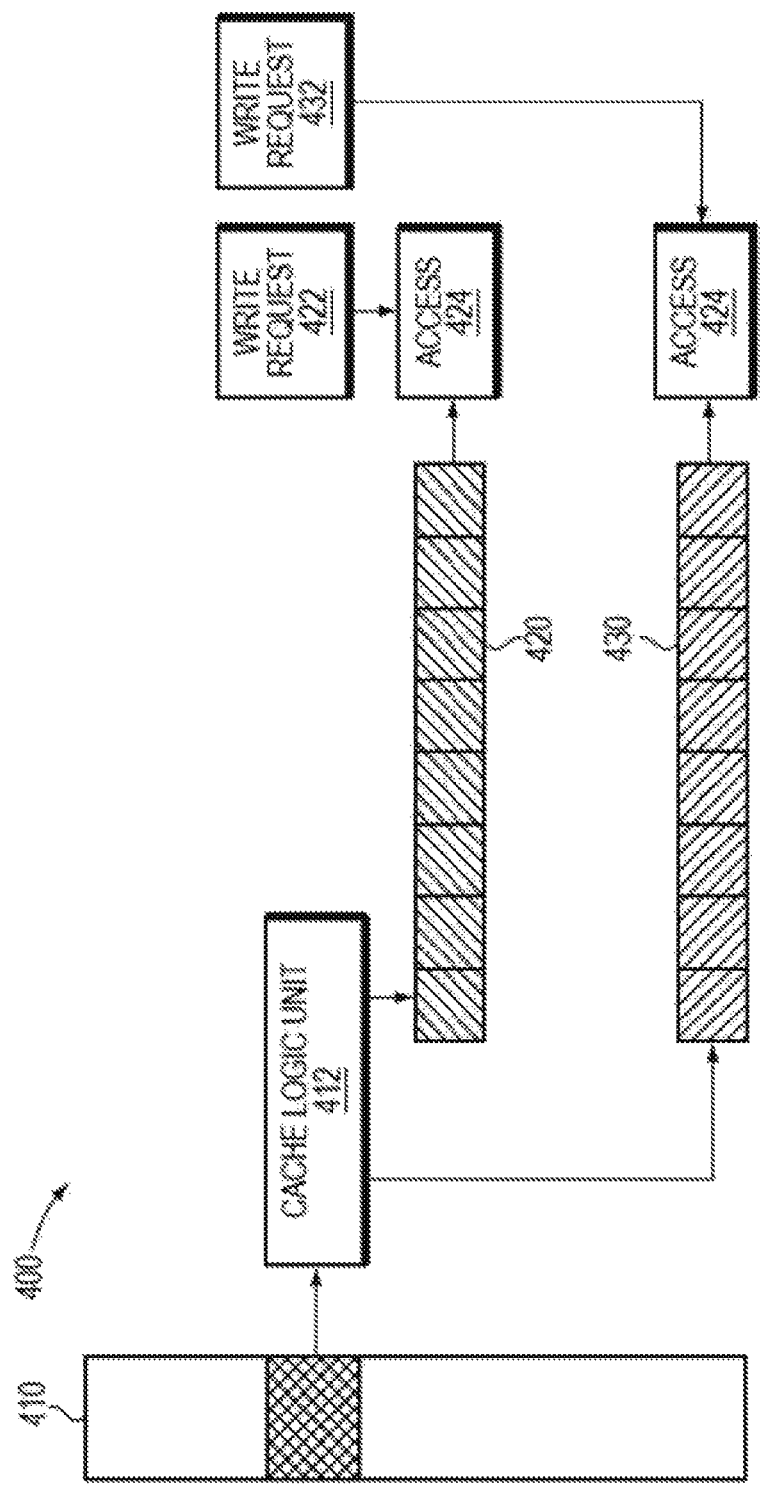
FIG. 4 illustrates a diagram of cache management according to embodiments of the present disclosure.

The method of cache management according to the present disclosure will be described below in detail with reference to FIGS. 3-4. FIG. 3 illustrates a flowchart of a method 300 of cache management according to embodiments of the present disclosure, and FIG. 4 illustrates a diagram 400 of cache management according to embodiments of the present disclosure.

At block 302, a write request for the cache logic unit is received. At block 304, it is determined whether a first cache space associated with the cache logic unit is locked. If the first cache space is not locked, the method 300 proceeds to the block 306, i.e., the write request is performed in the first cache space. As shown in FIG. 4, the system receives a first write request 422 and a second write request 432 for a cache logic unit 410. For the first write request 422, a first cache space 420 associated with the cache logic unit 412 is not locked before executing the first write request 422, and the first write request 422 can thus be executed in the first cache space 420. If the first cache space is locked, the method proceeds to the block 308.

At block 308, a second cache space associated with the cache logic unit is obtained. In some embodiments, a single cache logic unit may be associated with a plurality of cache spaces in advance. For example, a single cache logic unit may be associated with 128 cache spaces, and can then support parallel execution of at most 128 write requests for the cache logic unit.

In some embodiments, a plurality of cache spaces associated with a cache logic unit may be managed through a cache space list. When a new cache space for the write request is obtained, a new node is added to the cache space list to indicate that the cache space has been used. The node may record an identifier of the write request and an address of the cache space. In some embodiments, the cache space list can be implemented in form of a linked list, and a new node is added to the cache space linked list when a new cache space is obtained.

Specifically, as shown in FIG. 4, for the second write request 432, since the first cache space 420 is locked, the system may obtain a second cache space 430 associated with the cache logic unit 412 and can add to the cache space list a second node, which may record an identifier of the second write request 432 and an address of the second cache space 420. In some embodiments, the identifier of the write request may indicate a time stamp upon receiving the write request. For example, the identifier of the first write request 422 may be 2056, and the identifier of the second write request 432 may be 3106. The two identifiers respectively indicate time stamps upon receiving the first write request 422 and the second write request 432 and indicate that the second write request 432 is received later than the first write request 422.

At block 310, the write request is executed in the second cache space. Specifically, as shown in FIG. 4, the second write request 432 is performed in the second cache space 430. In this way, as shown in FIG. 4, parallel execution of a plurality of write requests (a first write request 422, a second write request 432 and the like) may be supported, thereby improving the response efficiency of the storage system.

Figure 5:
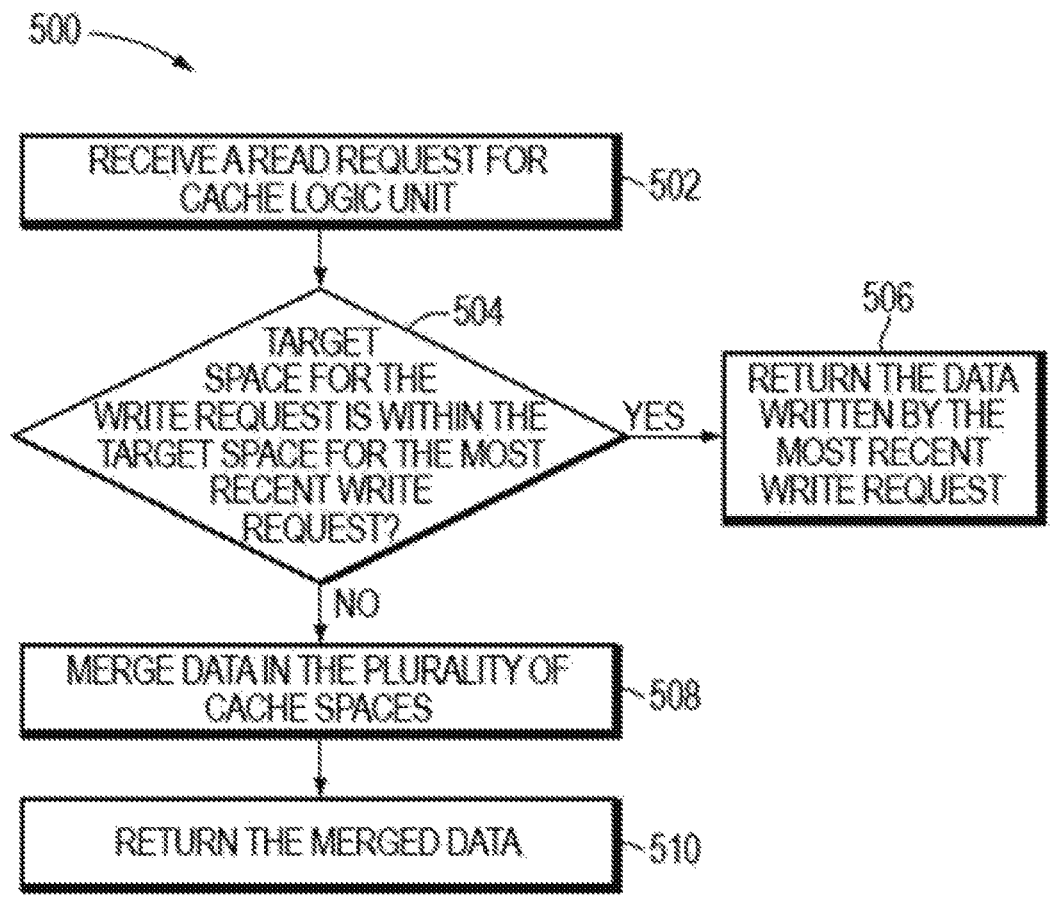
FIG. 5 illustrates a flowchart of a method of processing a read request according to embodiments of the present disclosure.

Several embodiments of a cache parallel-writing mechanism have been described above with reference to FIG. 3 and FIG. 4, in which the system need not to lock the cache logic unit to which a plurality of write requests are directed when processing a plurality of parallel write requests, and the system further may also execute read requests for the cache logic unit concurrently. A process of executing reading requests concurrently according to the present disclosure will be described below in detail with reference to FIGS. 5-6. FIG. 5 illustrates a flowchart of a method 500 of processing read requests according to embodiments of the present disclosure, and FIG. 6 illustrates a diagram 600 of merging data of a plurality of cache spaces according to embodiments of the present disclosure.

At block 502, a read request for a cache logic unit is received. Specifically, as shown in FIG. 6, the system receives a first read request 660 and a second read request 680 for the cache logic unit. The cache logic unit includes 128 cache spaces, and there is written data in the first cache space 620 and the second cache space 640. At block 504, it is determined whether the target space for the read request is within the target space for the most recent write request. If yes, the method proceeds to the block 506, i.e., it can directly return the data written by the most recent write request. Specifically, as shown in FIG. 6, for the first read request 660, its target space is the last three cache pages 662-666 in the cache logic unit, and the target space for the first read request 660 is within the target space (i.e., the last six cache pages 646-656 of the cache logic unit) of the most recent write request (i.e., the write request corresponding to the cache space 640). Hence, it can return data of the cache pages 652-656 in the second cache space 640 as a response to the first read request 660.

On the other hand, if it is determined at block 504 that a part of the target space for the read request is outside the target space for the most recent write request, the method 500 proceeds to the block 508. At block 508, data in a plurality of cache spaces associated with the cache logic unit are merged. In some embodiments, for each of the cache pages in the cache space, valid data which last written into may be determined as the merged data. As such, the system can quickly return the data requested by the read request.

Figure 6:
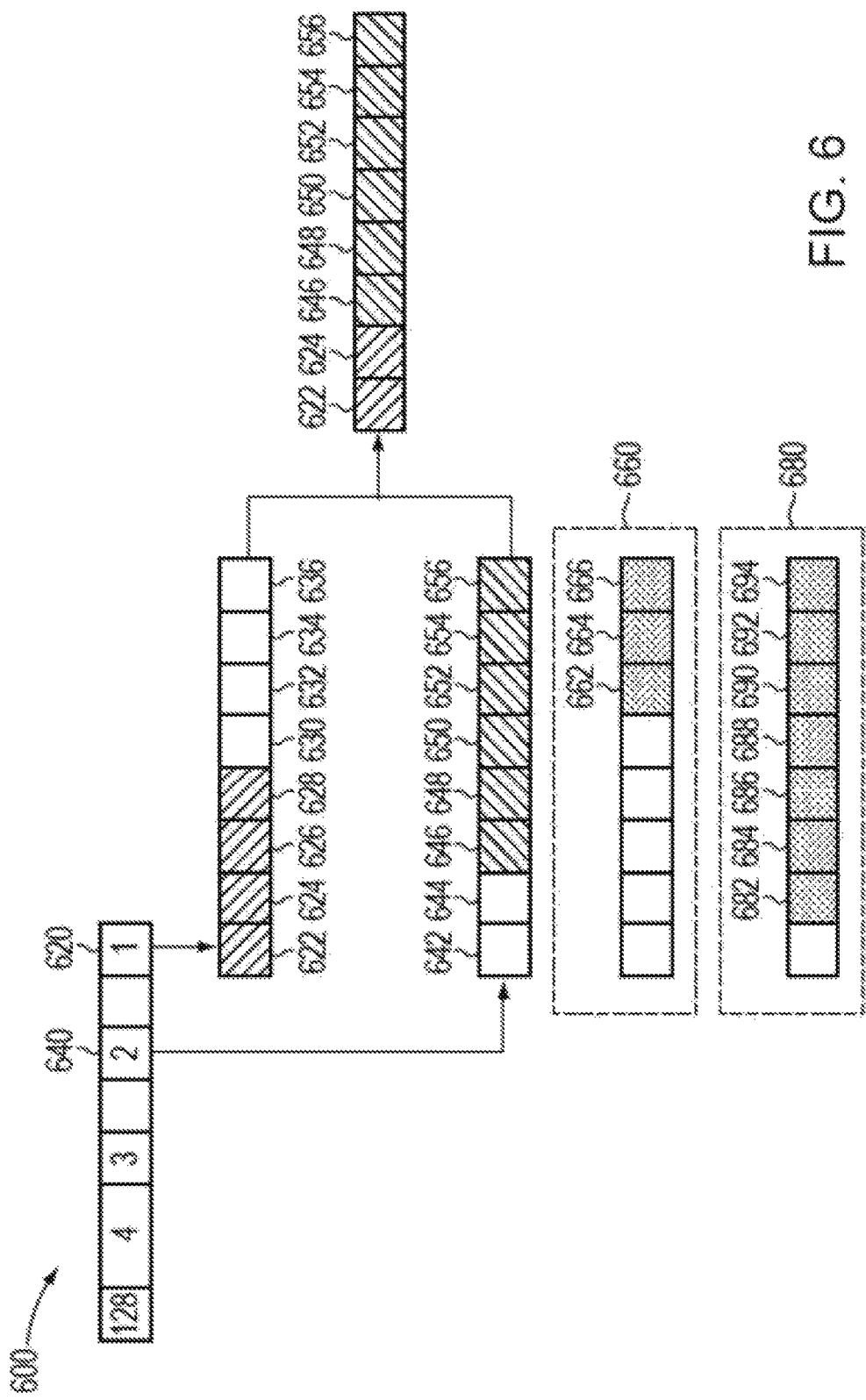
FIG. 6 illustrates a diagram of merging data of a plurality of cache spaces according to embodiments of the present disclosure.

As shown in FIG. 6, the cache page 682 in the target space for the second read request (which comprises the cache pages 682-694 of the cache logic unit in this example) is outside the target space (which comprises cache pages 646-656 of the cache logic unit in this example) of the most recent write request (i.e., the write request corresponding to the cache space 640), and an operation of merging data in a plurality of cache spaces of the cache logic unit is thus required to be performed, for ensuring accuracy of the returned data.

In FIG. 6, the cache logic unit includes a first cache space 620 and a second cache space 640 which have written data. Valid data is written into the cache pages 622-628 in the first cache space 620, while valid data is written into the cache pages 646-656 in the second cache space 640. Therefore, for the cache pages 622-624 and the cache pages 642-644, the valid data in the cache pages 622-624 in the first cache space 620 is to be the merged data. For the cache pages 626-628 and the cache pages 646-648, valid data are written into the first cache space 620 and the second cache space 640. However, since the write request corresponding to the second cache space 640 is newer than the write request corresponding to the first cache space 620, the data in the cache pages 646-648 in the second cache space 640 is to be the merged data.

For the cache pages 630-636 and the cache pages 650-656, the cache pages 630-636 of the first cache space 620 do not include valid data, and the data in the cache pages 650-656 of the second cache space is to be the merged data.

As such, the data finally merged by the cache logic unit include the data in the cache pages 622-624 in the first cache space 620 and the data in the cache pages 646-656 in the second cache space 640. As described above, a node in the cache space list records an identifier of the write request corresponding to each cache space, which indicates a time stamp upon receiving the request. Therefore, the time order of the write requests corresponding to the respective cache spaces may be determined based on the identifiers of the write requests for merging.

At block 508, the merged data is returned as a response to the read request. As shown in FIG. 6, for the second read request 680, the data in the cache page 624 in the first cache space 620 and the data in the cache pages 646-656 in the second cache space 640 serve as a response to the second read request 680. Based on the process described above, the system may perform the read request when executing a plurality of write requests concurrently and ensure accuracy of the returned data.

Figure 7:
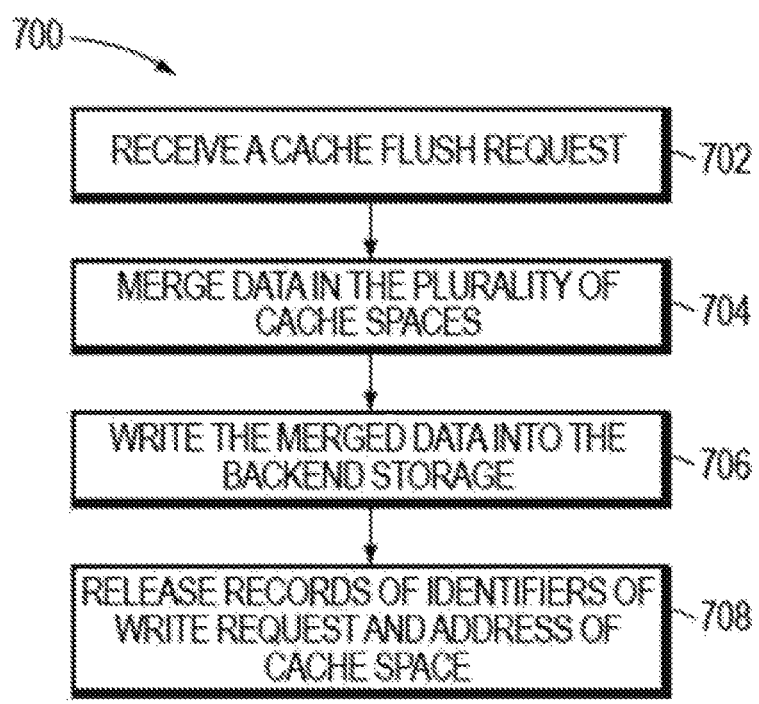
FIG. 7 illustrates a flowchart of a method of processing a flush request.

When the cache responds to the front end I/O request, the cache further needs to write finally into backend storage the data which the front end I/O request writes into the cache, which is referred to as "flush." A flush operation based on the conventional cache architecture typically requires locking the corresponding cache logic unit, thus affecting the response of the cache to the front end I/O requests. An asynchronous flush mechanism may be implemented based on the cache architecture according to the present disclosure. A flush mechanism based on the cache architecture of the present disclosure will be described below in detail with reference to FIG. 7. FIG. 7 illustrates a flowchart of a method 700 of processing a flush request according to embodiments of the present disclosure.

At block 702, a cache flush request is received to flush data in the cache logic unit to the backend storage. In some embodiments, the system may send a flush request periodically, and the system may continue executing the front end I/O request while responding to the flush request, i.e., the procedure of flushing the cached data to the backend storage is asynchronous to executing the received I/O request.

At block 704, in response to the received cache flush request, data in a plurality of cache spaces associated with the cache logic unit is merged. The merging procedure is identical to the merging procedure in the method of processing a read request as described above, which is thus not detailed herein. In the procedure, since the cache logic unit may have an available cache space, it may still respond to the front end write request concurrently when executing the merging. In this manner the front end I/O requests are not in conflict with the backend flush request, thereby increasing the efficiency of the memory system.

At block 706, the merged data are written into a physical address space in the backend storage associated with the cache logic unit.

At block 708, when the data in the cache logic unit are written into the backend storage, a plurality of cache spaces corresponding to the logic unit are released for reusing. It would be appreciated that the releasing procedure only enables rewriting into the cache spaces, rather than releasing the cache spaces into the storage space, and the cache logic unit still maintains the association with the plurality of cache spaces. In some embodiments, releasing the cache spaces may be implemented by releasing nodes in the cache space list associated with the plurality of cache spaces, i.e., releasing the identifiers of the write requests and the addresses of the cache spaces recorded in the nodes.

Based on such asynchronous flush mechanism, the front end I/O requests and the backend flush requests may be executed asynchronously, further improving the response efficiency and meanwhile ensuring the accuracy of the data written into the backend storage.

Figure 8:
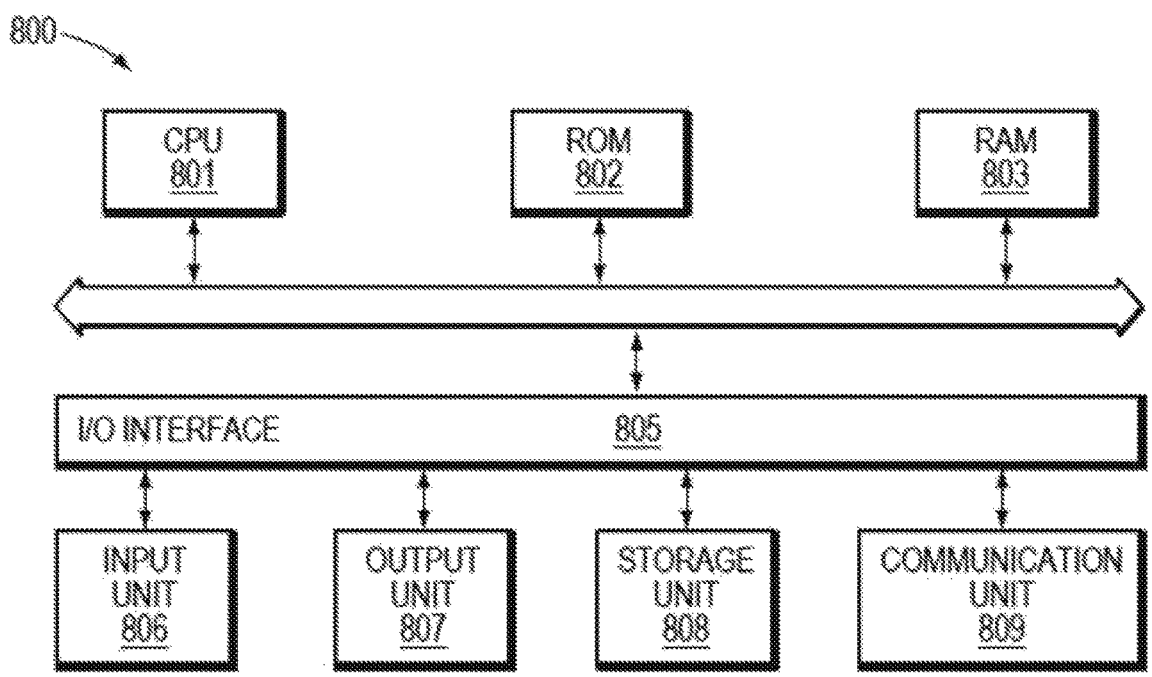
FIG. 8 illustrates a block diagram of an example device that can be used to implement embodiments of the present disclosure.

FIG. 8 is a schematic block diagram of an example apparatus that can be used to implement embodiments of the present disclosure. As shown in FIG. 8, the apparatus 800 comprises a central processing unit (CPU) 801 which is capable of performing various processes in accordance with computer program instructions stored in a read only memory (ROM) 802 or computer program instructions loaded from a storage unit 808 to a random access memory (RAM) 803. In the RAM 803 are stored various programs and data as required by operation of the apparatus 800. The CPU 801, the ROM 802 and the RAM 803 are connected to one another via a bus 804. An input/output (I/O) interface 806 is also connected to the bus 804.

The following components in the device 800 are connected to the I/O interface 805: an input unit 806 including a keyboard, a mouse, or the like; an output unit 807 such as various types of displays and speakers; the storage unit 808 such as a magnetic disk or optical disk; and a communication unit 809 such as a network card, a modem, a wireless communication transceiver or the like. The communication unit 809 allows the device 800 to exchange information/data with other devices through a computer network such as the Internet and/or various types of telecommunication networks.

The processing unit 801 performs various method and processes described above, for example methods 300. For example, in some embodiments, the method 300 may be implemented as a computer software program or computer program product, which is tangibly contained in a machine-readable medium, for example the storage unit 808. In some embodiments, part or all of the computer program may be loaded and/or installed on the device 800 via ROM 802 and/or communication unit 809. When the computer program is loaded in the RAM 803 and executed by CPU 801, one or more acts of the method 300 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for cache management, comprising:
   in response to receiving a write request for a cache logic unit, determining whether a first cache space of a plurality of cache spaces associated with the cache logic unit is locked;
   in response to the first cache space not being locked, performing the write request for the cache logic unit in the first cache space;
   in response to the first cache space being locked, (1) obtaining a second cache space from the plurality of cache spaces, the second cache space being different from the first cache space and being in an unlocked state; and (2) performing, in the second cache space, the write request for the cache logic unit; and
   in response to subsequently receiving a read request for the cache logic unit, determining whether a target space for the read request is within the second cache space, and (1) in response to the target space being within the second cache space, returning data written by the write request into the second cache space as a response to the read request, and (2) in response to at least a part of the target space being outside the second cache space, merging data of the first and second cache spaces and returning the merged data as a response to the read request.

2. The method according to claim 1, wherein obtaining the second cache space comprises:
   recording an identifier of the write request and an address of the second cache space.

3. The method according to claim 2, wherein the identifier of the write request indicates a time stamp upon receiving the write request.

4. The method according to claim 1, further comprising:
   in response to receiving a cache flush request, merging data in the plurality of cache spaces associated with the cache logic unit; and
   writing the merged data into a backend storage address space associated with the cache logic unit.

5. The method according to claim 4, further comprising:
   after completion of writing the merged data into the backend storage address space associated with the cache logic unit, releasing records of the identifier of the write request and an address of the second cache space.

6. The method according to claim 1, wherein each of the plurality of cache spaces comprises a plurality of cache pages, and the merging comprises:
   for respective cache pages of the plurality of cache spaces, determining valid data which is last written into as the merged data.

7. A device for cache management, comprising:
   at least one processing unit; and
   at least one memory coupled to the at least one processing unit and storing instructions executed by the at least one processing unit, the instructions when executed by the at least one processing unit causing the device to execute acts, the acts comprising:
   in response to receiving a write request for a cache logic unit, determining whether a first cache space of a plurality of cache spaces associated with the cache logic unit is locked;
   in response to the first cache space not being locked, performing the write request for the cache logic unit in the first cache space;
   in response to the first cache space being locked, (1) obtaining a second cache space from the plurality of cache spaces, the second cache space being different from the first cache space and being in an unlocked state; and (2) performing, in the second cache space, the write request for the cache logic unit; and
   in response to subsequently receiving a read request for the cache logic unit, determining whether a target space for the read request is within the second cache space, and (1) in response to the target space being within the second cache space, returning data written by the write request into the second cache space as a response to the read request, and (2) in response to at least a part of the target space being outside the second cache space, merging data of the first and second cache spaces and returning the merged data as a response to the read request.

8. The device according to claim 7, wherein obtaining the second cache space comprises:
   recording an identifier of the write request and an address of the second cache space.

9. The device according to claim 8, wherein the identifier of the write request indicates a time stamp upon receiving the write request.

10. The device according to claim 7, the acts further comprising:
in response to receiving a cache flush request, merging data in the plurality of cache spaces associated with the cache logic unit; and
writing the merged data into a backend storage address space associated with the cache logic unit.

11. The device according to claim 10, the acts further comprising:
after completion of writing the merged data into the backend storage address space associated with the cache logic unit, releasing a record of the identifier of the write request and an address of the second cache space.

12. The device according to claim 7, wherein each of the plurality of cache spaces comprises a plurality of cache pages, and the merging comprises:
for respective cache pages of the plurality of cache spaces, determining valid data which is last written into as the merged data.

13. A computer program product for cache management, the computer program product comprising:
a non-transitory computer readable medium encoded with computer executable code, wherein the code is configured for the execution of:
in response to receiving a write request for a cache logic unit, determining whether a first cache space of a plurality of cache spaces associated with the cache logic unit is locked;
in response to the first cache space not being locked, performing the write request for the cache logic unit in the first cache space;
in response to the first cache space being locked, (1) obtaining a second cache space from the plurality of cache spaces, the second cache space being different from the first cache space and being in an unlocked state; and (2) performing, in the second cache space, the write request for the cache logic unit; and
in response to subsequently receiving a read request for the cache logic unit, determining whether a target space for the read request is within the second cache space, and (1) in response to the target space being within the second cache space, returning data written by the write request into the second cache space as a response to the read request, and (2) in response to at least a part of the target space being outside the second cache space, merging data of the first and second cache spaces and returning the merged data as a response to the read request.

14. The computer program product according to claim 13, wherein obtaining the second cache space comprises:
recording an identifier of the write request and an address of the second cache space.

15. The method according to claim 1, wherein the merging data of the first and second cache spaces includes:
for first data residing in the second cache space, selecting that first data from the second cache space as a first part of the merged data returned in response to the read request; and
for second data residing in the first cache space and not residing in the second cache space, selecting that second data from the first cache space as a second part of the merged data returned in response to the read request.

* * * * *